(12) United States Patent
Nobel

(10) Patent No.: US 12,228,137 B2
(45) Date of Patent: Feb. 18, 2025

(54) MANUFACTURE OF AN IMPELLER IN A HYBRID PROCESS

(71) Applicant: KSB SE & Co. KGaA, Frankenthal (DE)

(72) Inventor: Tammuz Nobel, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/281,035

(22) PCT Filed: Mar. 4, 2022

(86) PCT No.: PCT/EP2022/055537
§ 371 (c)(1),
(2) Date: Sep. 8, 2023

(87) PCT Pub. No.: WO2022/189286
PCT Pub. Date: Sep. 15, 2022

(65) Prior Publication Data
US 2024/0141914 A1     May 2, 2024

(30) Foreign Application Priority Data

Mar. 9, 2021   (DE) ..................... 10 2021 105 610.1

(51) Int. Cl.
*F04D 29/22*     (2006.01)
*B33Y 80/00*     (2015.01)
(Continued)

(52) U.S. Cl.
CPC .............. *F04D 29/22* (2013.01); *B33Y 80/00* (2014.12); *F04D 1/00* (2013.01); *F04D 1/06* (2013.01);
(Continued)

(58) Field of Classification Search
CPC ... F04D 29/22; F04D 1/00; F04D 1/06; F04D 17/00; F04D 29/62; B33Y 80/00; F05D 2230/31
See application file for complete search history.

(56) References Cited

U.S. PATENT DOCUMENTS 11,441,574 B2 * 9/2022 Sankar Ram ......... F04D 29/626
2003/0235502 A1 * 12/2003 Van Dine ............. F04D 29/326
416/230
(Continued)

FOREIGN PATENT DOCUMENTS

DE     10 2014 012 480 B4     6/2016
DE     10 2015 202 417 A1     8/2016
(Continued)

OTHER PUBLICATIONS

International Search Report (PCT/ISA/210) issued in PCT Application No. PCT/EP2022/055537 dated Jun. 15, 2022 with English translation (4 pages).
(Continued)

*Primary Examiner* — Courtney D Heinle
*Assistant Examiner* — Andrew J Marien
(74) *Attorney, Agent, or Firm* — Crowell & Moring LLP

(57) ABSTRACT

An apparatus for a centrifugal pump includes an impeller. The impeller has a rear shroud on which blades are arranged. The impeller has a hybrid component structure. The hybrid structure includes at least one generative component and at least one conventional component. At least one of the generative component and the conventional component is subdivided into at least two segments.

14 Claims, 3 Drawing Sheets

(51) Int. Cl.
  *F04D 1/00*    (2006.01)
  *F04D 1/06*    (2006.01)
  *F04D 17/00*   (2006.01)
  *F04D 29/62*   (2006.01)

(52) U.S. Cl.
  CPC ............. *F04D 17/00* (2013.01); *F04D 29/62* (2013.01); *F05D 2230/31* (2013.01)

(56) References Cited

U.S. PATENT DOCUMENTS

| | | | |
|---|---|---|---|
| 2014/0308132 A1* | 10/2014 | Kim | F01D 5/225 |
| | | | 29/889.7 |
| 2015/0017013 A1 | 1/2015 | Tozzi et al. | |
| 2016/0003257 A1* | 1/2016 | Palomba | F04D 17/10 |
| | | | 416/189 |
| 2017/0107821 A1 | 4/2017 | Schwarz | |
| 2017/0189966 A1* | 7/2017 | Giannozzi | B33Y 80/00 |
| 2017/0260997 A1 | 9/2017 | Mola et al. | |
| 2018/0236595 A1 | 8/2018 | Boehm et al. | |
| 2019/0313878 A1 | 10/2019 | Dries | |
| 2019/0390686 A1 | 12/2019 | Will | |

FOREIGN PATENT DOCUMENTS

| | | |
|---|---|---|
| DE | 10 2015 117 463 A1 | 4/2017 |
| DE | 10 2016 225 018 A1 | 6/2018 |

OTHER PUBLICATIONS

German-language Written Opinion (PCT/ISA/237) issued in PCT Application No. PCT/EP2022/055537 dated Jun. 15, 2022 with English translation (8 pages).

German-language Search Report issued in German Application No. 10 2021 105 610.1 dated Feb. 24, 2022 with partial English translation (11 pages).

* cited by examiner

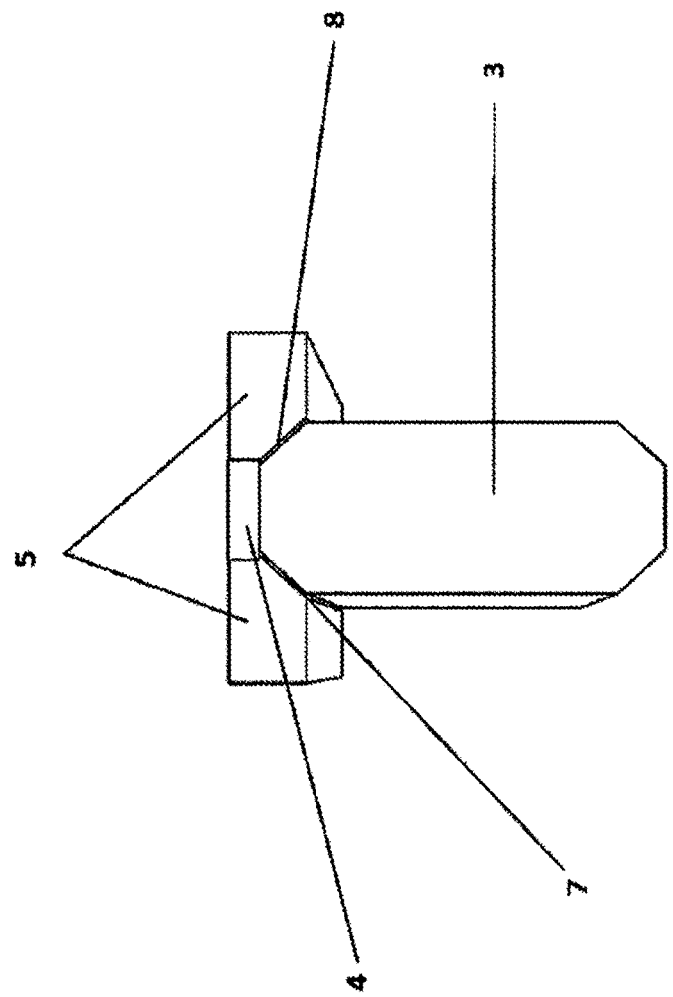

MANUFACTURE OF AN IMPELLER IN A HYBRID PROCESS

CROSS REFERENCE TO RELATED APPLICATIONS

This application claims priority under 35 U.S.C. § 119 from German Patent Application No. 102021105610.1, filed Mar. 9, 2021, the entire disclosure of which is herein expressly incorporated by reference.

BACKGROUND

The disclosure relates to an impeller for a centrifugal pump, with a rear shroud on which blades are arranged.

An impeller is a rotating component, furnished with blades, of a fluid-flow machine, for instance of a centrifugal pump. Mechanical power is converted here into conveying capacity by deflection of the flow on the blades.

For the purpose of accommodating the blades, all the impellers have a rear supporting shroud and, when the impellers are closed, also a front covering shroud. Another way of looking at this is that an impeller is provided with an inner front shroud and, when the impeller is closed, also with an outer front shroud. If the front or outer covering shroud is missing from an impeller, the impeller is considered to be open.

In DE 10 2016 225 018 A1 such a radial impeller of a centrifugal pump is described by way of example. Blades are arranged between a rear shroud and a front shroud. The fluid flows in the axial direction toward the impeller, is deflected by 90°, and then emerges from the impeller in the radial direction.

In the case of an additive manufacture of components, the respective product is built up, layer by layer, from a construction material that is applied onto a foundation. The construction material is usually present in powder form. The pulverulent material is completely melted down locally by means of radiation at the respective places, and forms a solid layer of material after solidification. Subsequently the base plate on which the pulverulent material is located is lowered by the magnitude of a layer thickness, and powder is again applied. This cycle is repeated until such time as all the layers of a component have been produced. The finished component is cleansed of the excess powder.

The data for guiding the radiation are generated on the basis of a 3D CAD body by means of software. A laser beam, for instance, may be employed by way of radiation. As an alternative to selective laser melting, an electron beam (EBM) may also be employed.

For each layer, the regions that form the structures of the component are melted down selectively. In order, in the next step, to connect the underlying layer to the layer situated above it, the radiation melts up to three underlying layers which subsequently fuse with the uppermost layer in the course of the rapid cooling process.

In DE 10 2015 202 417 A1 a flow-guiding component, in particular a radial impeller, is described that has been produced by successive consolidating of layers by means of radiation. Functional regions with differing properties are generated by varying the radiation.

Components—such as impellers, for instance—that are produced by an additive method are very limited in their dimensions. Hitherto, only components measuring up to about thirty centimeters have been able to be produced. In addition, additive production for a component that is to be produced in large numbers is expensive in comparison with conventional methods.

SUMMARY

It is an object of the disclosure to generate an impeller, also a large impeller, for flow-guiding components. The impeller is to be assembled from segments that were generated by differing production methods. The segments are to be capable of being configured individually as regards their material combinations, properties and material thickness. This impeller is to be capable of being realized easily and inexpensively.

In accordance with the disclosure, this object is achieved by an impeller for a centrifugal pump and by a method for producing an impeller. Preferred variants can be gathered from the dependent claims, the description and the drawings.

In accordance with the disclosure, an impeller for a centrifugal pump, with a rear shroud on which blades are arranged, has been constructed as a hybrid component from at least one generative component and at least one conventional component, at least one component having been subdivided into at least two segments.

A generative component has been generated by a generative manufacturing method. The term "generative manufacturing method" encompasses all manufacturing methods in which material is applied, layer by layer, and consequently three-dimensional components are generated. Construction in layers is undertaken in computer-controlled manner from one or more liquid or solid materials in accordance with specified dimensions and shapes. In the course of construction, physical or chemical hardening processes or melting processes take place. Typical materials for "3D printing" are plastics, synthetic resins, ceramics, metals, carbon materials and graphite materials.

The term "conventional component" designates a component that is generated by means of primary shaping, reshaping or a subtractive manufacturing method. Primary shaping is a main group of manufacturing methods, in which a solid body that has a geometrically defined shape is produced from an amorphous substance. Primary shaping is utilized in order to produce the initial shape of a solid body and to create the cohesion of its substance. In the case of reshaping, unmachined parts consisting of plastically deformable materials are brought into a different shape in targeted manner without removing material from the unmachined parts. In the case of the subtractive manufacturing method, something is separated from the workpiece. In addition to the component generated, splinters predominantly arise in this case.

According to the disclosure, the blades are generated from a pulverulent metallic material by a generative method, preferably by means of selective laser melting using a laser beam or an electron beam. In an alternative embodiment of the disclosure, the blades can also be generated from meltable plastic by extrusion and hardening. Also in accordance with the disclosure is the generation of hybrid blades in which thin layers of metal deposited by means of cold gas spraying have been applied to a plastic framework.

The impeller is advantageously provided with a front shroud. An impeller with a front shroud is designated as a closed impeller of a centrifugal pump, which displays outstanding efficiency with an extremely small reflux by virtue of the interaction with a split ring.

The rear shroud has been produced as a conventional and/or generative component. The rear shroud is preferably a cast product. In an alternative variant of the disclosure, the rear shroud has preferably been formed in segments by means of selective laser melting, the rear shroud subsequently being assembled with the blades as a rear shroud with blades in an integrative manufacturing unit in a joining method.

In accordance with the disclosure, the front shroud takes the form of a conventional component which is preferably produced by means of a casting method. Alternatively, the front shroud—in particular, the segments of the front shroud—can be produced by means of a metal-cutting method, preferably by means of milling. Ideally, the front shroud has been subdivided into at least two segments. One component—such as, for instance, the front shroud and/or the rear shroud—exhibits more than two segments, preferably more than three, in particular more than four, and/or fewer than ten, preferably fewer than nine, in particular fewer than eight.

The number of segments advantageously corresponds to the number of blades. Both the segments and the blades exhibit a shape that is curved radially outward. In this respect, the segments have been formed as a constituent part between two blades. Ideally, a connecting joint by way of connecting element connects two segments and one blade. Altogether this results in an impeller for a centrifugal pump, in which the number of blades corresponds to the number of connecting joints. The connecting joints are preferably generated by a joining method—in particular, welding—in an integrative manufacturing unit.

Of particularly great advantage is the manufacture also of large impellers in an integrative, additive manufacturing method. Through the use of a particularly mobile robotic arm, which is provided with various tools pertaining to additive manufacture as well as jointing technology, particularly complex and also large impellers can be manufactured. For instance, the blades can be generated with the tool for selective laser melting, the positioning of the conventional components with the blades can be carried out with a fixing tool, and the connecting joints can be formed with the welding tool.

In the case of joining, two or more solid bodies—the parts to be joined—are permanently connected with geometrically determined configuration. In the case of welding, an inseparable connection of segments and a blade arises by application of heat and/or pressure, with or without added welding materials. The added materials are ordinarily supplied in the form of rods or wires, are melted down, and solidify in the joint between the partners to be joined, in order in this way to generate the connection. Welding is numbered among the methods for connection by material closure, whereby high-strength connections are generated.

In an alternative variant of the disclosure, pressing could be employed by way of joining method. In this case, great forces bring about the formation of a permanent connection between the segments and the blade.

The connecting joint advantageously connects the segments of a component and the blades in almost gap-free manner. The gap amounts to less than 10 µm, preferably less than 7.5 µm, in particular less than 5 µm. Ideally, an impeller consisting of many individual parts consequently arises which displays no disadvantages in terms of flow mechanics compared with an impeller generated by primary shaping. Of particular great advantage is the generation of impeller geometries that cannot be generated—or that can only be generated with difficulty—by conventional manufacturing methods. As a result, large impellers with better hydraulic efficiencies can also be generated by manufacture as a hybrid component.

In accordance with the disclosure, the blades exhibit points of support for the segments, by virtue of which the gap-free joining can first be realized. A firm and secure support is an important prerequisite for the joining method for generating the connecting joint between the segments and the blade.

For this purpose, ideally the joining surfaces of the segments and of the blade have preferably been rounded and/or beveled for the purpose of forming the connecting joint. The arrangement prior to joining arises in almost gap-free manner and is securely positioned so as to oppose slipping in the integrative manufacturing unit.

In an alternative variant of the disclosure, a stop and/or a support groove may have been formed on the blade, in order to position the segments for the joining method.

According to the disclosure, the method for producing an impeller by means of an integrative manufacturing unit consists of the forming of the segments of a front shroud and/or of the segments of a rear shroud by primary shaping and/or machining, the forming of the blades by a generative method, and the joining of the blades and of the segments to form a hybrid impeller.

The method according to the disclosure is distinguished by segments and/or blades that are capable of being configured in particularly individual manner. Adaptations of the impeller can be taken into account by the generative manufacture, depending upon the requirements of the centrifugal pump. Expensive individual fabrication becomes distinctly more inexpensive by virtue of the comparatively favorable, segmented, conventionally manufactured components and the joining process. In addition, the components manufactured generatively may exhibit a shape that can achieve a higher pump efficiency and that could not be obtained hitherto by conventional manufacturing.

Ideally, the impeller, which is generated as a hybrid component from at least one generative component and at least one conventional component, is used as impeller for a centrifugal pump. The impeller is distinguished by outstanding flow-mechanical properties and may exhibit a size that cannot be generated with the known generative manufacturing units.

Further features and advantages of the disclosure will become apparent from the description of exemplary embodiments with reference to the drawings, and from the drawings themselves, in which:

BRIEF DESCRIPTION OF THE DRAWINGS

FIG. 3 is a perspective representation of two segments and one blade.

DETAILED DESCRIPTION

Figure 1:
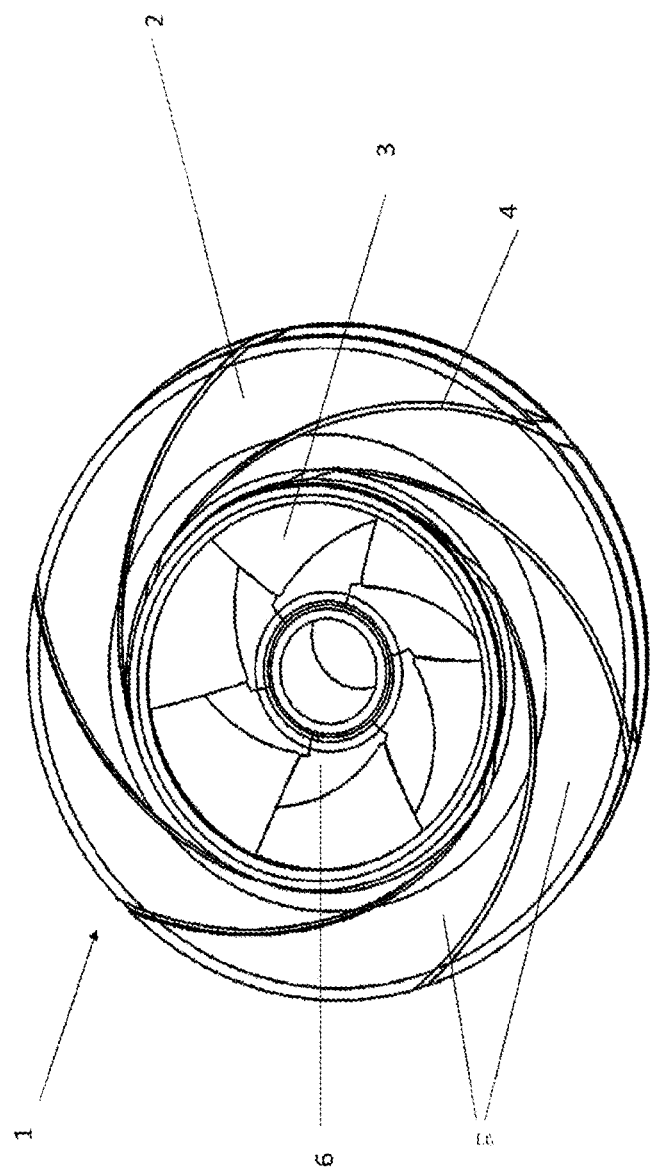
FIG. 1 is a plan view of an impeller.

FIG. 1 shows a plan view of a closed, radial impeller 1.

The front shroud 2 has been assembled from segments 5 with connecting joints 4. The connecting joint 4 is preferably a weld seam. The blades 3 are arranged between the front shroud 2 and the rear shroud 6.

The shape of a segment 5 takes the form of a constituent part between two blades 3. The connecting joints 4, the lateral edges of the segments 5 and the blades 3 exhibit an outwardly curved shape.

Figure 2:
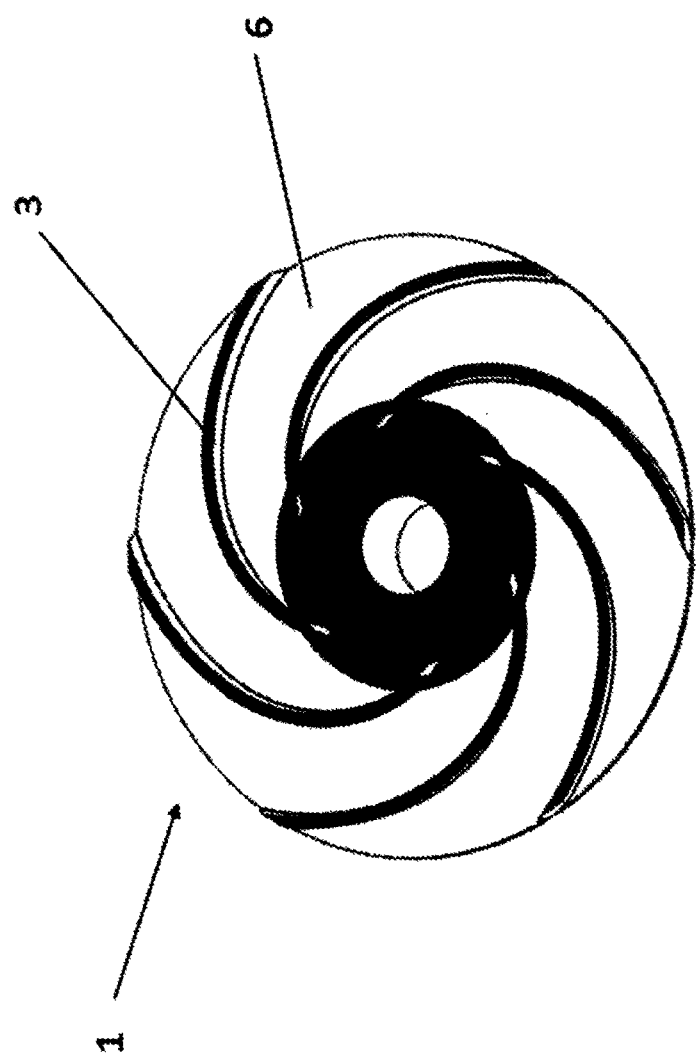
FIG. 2 is a plan view of an impeller without front shroud.

FIG. 2 shows a plan view of an impeller 1 without front shroud. The blades 3 are arranged on the rear shroud 6. The blades 3 exhibit an outwardly curved shape.

FIG. 3 shows a perspective representation of two segments 5 and one blade 3. The segments 5 and the blade 3 have been assembled with a connecting joint 4. In this exemplary embodiment, the connecting joint 4 takes the form of a welding groove which has preferably been implemented by an integrative manufacturing unit. The connecting joint 4 connects the segments 5 and the blade 3 in almost gap-free manner. The gap 7 amounts to less than 10 µm, preferably less than 7.5 µm, in particular less than 5 µm. In this exemplary embodiment, the joining surfaces 8 of the segments 5 and of the blade 3 for forming the connecting joint 4 have been formed with a rounding, so that the support for the joining process has been optimally configured. In another embodiment variant, inclined or angular joining surfaces are also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An apparatus for a centrifugal pump, comprising:
   an impeller having a rear shroud on which blades are arranged, wherein
   the impeller has a hybrid component structure including at least one generative component and at least one conventional component, at least one of the generative component and the conventional component being subdivided into at least two segments,
   a connecting joint is a connecting element between two of the segments and one of the blades, and
   the connecting joint connects the segments and the blade with a small gap, that measures at most 10 µm, between the segments and the blade in a working state of the centrifugal pump.

2. The apparatus as claimed in claim 1, wherein the blades are generatively-constructed.

3. The apparatus as claimed in claim 2, wherein the impeller includes a front shroud.

4. The apparatus as claimed in claim 3, wherein the front shroud is the conventional component.

5. The apparatus as claimed in claim 4, wherein the rear shroud is conventionally and/or generatively formed.

6. The apparatus as claimed in claim 5, wherein a number of the segments corresponds to a number of blades.

7. The apparatus as claimed in claim 6, wherein the component has more than two segments and/or fewer than ten segments.

8. The apparatus as claimed in claim 7, wherein the segments have a shape that is curved radially outward.

9. The apparatus as claimed in claim 8, wherein the shape of a segment is a constituent part between two blades.

10. The apparatus as claimed in claim 1, wherein the blades include points of support for the segments.

11. The apparatus as claimed in claim 10, wherein joining surfaces of the segments and of the blades are rounded and/or beveled to thereby form the connecting joint.

12. The apparatus as claimed in claim 1, wherein
    a total number of the at least two segments is identical to a total number of the blades,
    the segments and the blades are curved radially outwards,
    one of the segments is disposed as a section between two of the blades,
    the blades have support points for the segments, and
    a joining surfaces of the segments and the blades that form the connecting joint are rounded or tapered.

13. A method for producing the apparatus as claimed in claim 11 by means of an integrative manufacturing unit, the method comprising:
    forming the segments of the front shroud and/or of the rear shroud by primary shaping and/or machining;
    forming the blades by a generative method; and
    joining the blades and the segments to form an impeller generated by hybrid means.

14. A method comprising:
    using the apparatus of claim 1 as the impeller in a centrifugal pump.

* * * * *